United States Patent
Caillet

[11] 3,931,834
[45] Jan. 13, 1976

[54] EXPANSION TANK DIAPHRAGM ASSEMBLY

[75] Inventor: Eugene Caillet, St Marys, Ohio

[73] Assignee: The Goodyear Tire & Rubber Company, Akron, Ohio

[22] Filed: June 26, 1974

[21] Appl. No.: 483,188

[52] U.S. Cl. .............................. 138/30; 222/386.5
[51] Int. Cl.² ......................................... F16L 55/04
[58] Field of Search ............. 138/30; 239/322, 323; 222/95, 386.5; 92/98, 98 D; 277/208, 209

[56] References Cited
UNITED STATES PATENTS

| | | | |
|---|---|---|---|
| 2,815,152 | 12/1957 | Mills | 222/386.5 |
| 2,893,433 | 7/1959 | MacDuff | 138/30 |
| 3,035,614 | 5/1962 | Kirk | 138/30 |
| 3,288,168 | 11/1966 | Mercier et al. | 138/30 |
| 3,425,593 | 2/1969 | Kramer et al. | 138/30 X |
| 3,524,475 | 8/1970 | Kirk | 138/30 |
| 3,623,512 | 11/1971 | Ellswanger et al. | 138/30 |

*Primary Examiner*—Richard E. Aegerter
*Assistant Examiner*—James E. Bryant, III
*Attorney, Agent, or Firm*—F W Brunner; L A Germain

[57] ABSTRACT

An expansion tank is divided into two non-communicating chambers by a flexible elastomeric diaphragm having a peripheral outward projecting, sidewall engaging protrusion that is held in compressed and sealing engagement with the tank walls by a backup ring. The diaphragm-ring assembly facilitates insertion of the diaphragm, provides a positive seal, and prevents the assembly from being forced out of position by extreme pressure differentials.

10 Claims, 4 Drawing Figures

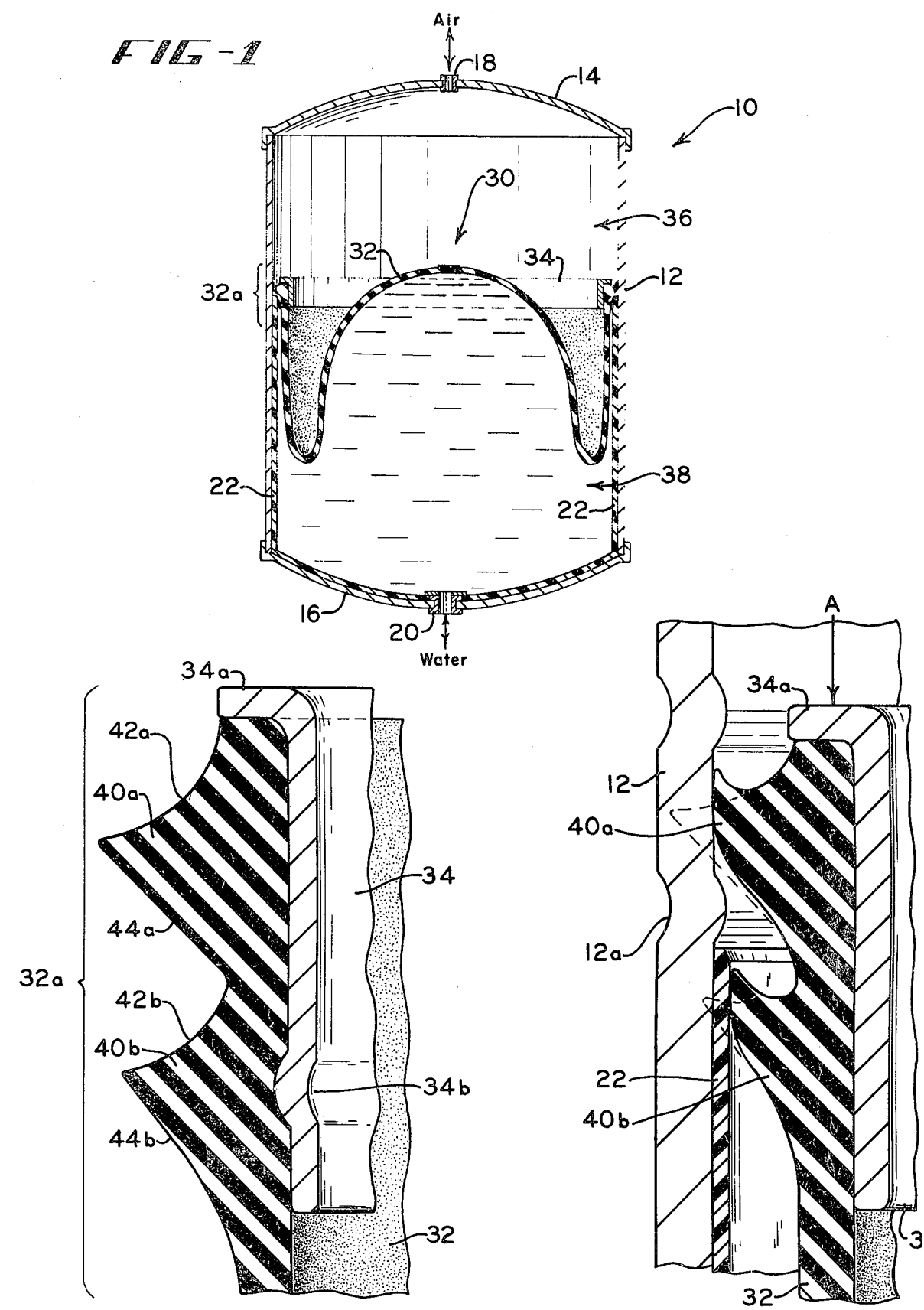

3,931,834

EXPANSION TANK DIAPHRAGM ASSEMBLY

BACKGROUND OF THE INVENTION

This invention relates to closed water systems and more specifically to an improved diaphragm assembly as used in an expansion tank forming a part of the system.

Expansion tanks, as used in domestic water systems, provide an air surge chamber that accounts for variations in pressure within the system. Tanks of this type are divided into chambers by a flexible diaphragm wherein gas under pressure is contained in one chamber while system water is contained in the other. The water chamber is connected to the system and changes in pressure are created by the increase and decrease associated with water volume usage in the normal cyclic operation of the system. Expansion tanks of this general type are described in U.S. Pat. Nos. 2,695,753 and 3,035,614 to C H Kirk, Jr., and 2,815,152 to L E Mills.

Recent improvements in tank design include glass or plastic liners that makes assembly of the tanks as taught by the prior art, more difficult, especially as it relates to positioning and sealing of a flexible diaphragm within the tank and closure of the tank without damaging the diaphragm seal and/or liner.

Therefore, it is a primary object of this invention to provide a diaphragm assembly that is easily installed, facilitates tank assembly, and provides a positive seal in either lined or unlined expansion tanks.

SUMMARY OF THE INVENTION

According to this invention, the beforementioned and related objects are accomplished in an assembly comprising a flexible elastomeric diaphragm having a laterally projecting peripheral protrusion, said diaphragm positioned within an expansion tank such that the protrusion deforms in sealing engagement with the tank wall, and a continuous backup ring positioned on the inner surface of the diaphragm in the area of the protrusion having a diameter such that the diaphragm elastomer is in compression when the assembly is installed in the tank.

DESCRIPTION OF THE DRAWINGS

The features of the invention may best be understood from a consideration of the following description taken in conjunction with the accompanying drawing, in the several figures of which like reference numerals identify like elements, and in which:

FIG. 1 is an elevational view, in section, showing the features embodying the invention;

FIG. 2 is an enlarged section through the peripheral edge of the diaphragm/ring assembly;

FIG. 3 is an enlarged section through the tank and diaphragm/ring assembly showing the sealing relationship therebetween.

DETAILED DESCRIPTION OF THE INVENTION

Figure 4:
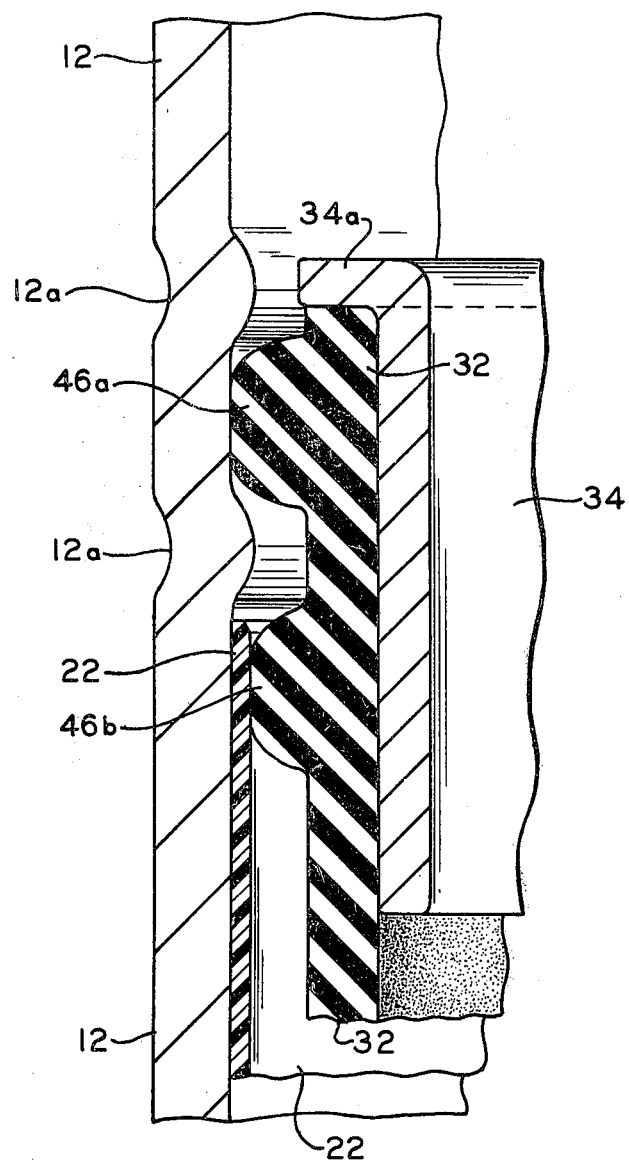
FIG. 4 is an enlarged section through the peripheral edge of a second embodiment of the assembly showing its sealing relationship with the tank wall and liner.

In the drawing, FIG. 1 illustrates a conventional expansion tank generally indicated by reference numeral 10. Tank 10 includes a substantially cylindrical body 12 and end walls 14 and 16, each of which contain connections 18 and 20 therein for communication to sources of air and water (not shown) respectively.

A cylindrical liner 22 is shown installed in the tank, however, its use is incidental and not a requirement in the application of the present invention. This will become clear as the description proceeds.

Installed within the tank 10 is an assembly generally indicated by numeral 30 which comprises a substantially flexible elastomeric diaphragm 32 and a rigid backing ring 34. The diaphragm 32 divides the tank 10 into two non-communicating chambers generally indicated by reference numerals 36 and 38, the sizes of which may be determined by the axial dimensions of the diaphragm. Obviously, a shallow diaphragm will restrict the size of chamber 36 while a deeper diaphragm will allow for an enlarged chamber area 36. In either case, the amount of water in the chamber 38 will be a determining factor on the axial excursion of the diaphragm 32.

FIGS. 2 and 3 more clearly illustrate the features of one embodiment of the invention as it relates to the diaphragm/backing-ring assembly. The bead or peripheral portion 32a of the diaphragm 32 comprises annular outward projecting wedge-shaped fins 40a and 40b having concave surfaces 42a and 42b and straight-tapered surfaces 44a and 44b. The relaxed diameter of the inside peripheral surface of the diaphragm is slightly less than the outside diameter of the backing ring 34 such that it must be stretched over the ring until it abuts an outwardly protruding flange 34a. The greatest diameter of the diaphragm is reached in its mounted position on the ring 34 and is located at the outward projection of the fins 40a or 40b. This diameter is slightly greater than the inside diameter of the tank walls 12.

Mounting of the diaphragm-ring assembly 30 into the tank 12 is accomplished by inserting the closed end of the diaphragm into the tank and applying force to the ring flange 34a at various locations around its periphery and in the direction of arrow A shown in FIG. 3. As the open end of the diaphragm enters the tank, the fins 40a-b are deformed in the direction of their concave surfaces and tend to follow the inside surface contour of the tank walls. In this condition, the fins provide positive sealing engagement with the tank walls and also maintain seating of the diaphragm by virtue of the resistance to movement in a direction opposing arrow A. When a glass or plastic liner 22 is installed in the tank, the fins deform to the inner diameter of both tank wall and liner, thus providing a leakproof seal for both surfaces and installation may be made without thought of breaking or chipping the liner. For extremely heavy gauge liners fin 40b may be of a lesser diameter than fin 40a. In this arrangement the movement of the assembly in the easy direction of arrow A is checked by the extreme compression of fin 40a when moved into the liner area, and in the opposite direction by the resistance of the fins to flip over toward their straight tapered surfaces. Various additional features may be added to the basic concept that provide ease of locating and positive seating of the assembly 30 within the tank. For example, as illustrated in FIG. 2, the backing ring 34 may include one or more outwardly projecting depressions 34b. These may be in the form of annular ribs or else multiple dimples formed in the ring 34. Their purpose is to restrict movement of the diaphragm in the easy direction of arrow A such that separation of the diaphragm and backing ring does not occur.

An alternate embodiment may further provide inwardly projecting depressions 12a in the tank walls as illustrated in FIG. 3. The depth of these inward projecting ribs or dimples 12a will be such to preclude further excursion of the diaphragm in the direction of arrow A by the fin 40a. Obviously, such depressions will also increase the difficulty of movement in the opposite direction. In some conventional tanks inwardly projecting ribs are formed by reason of the manner of fabricating the tank. In these, the tank is formed of two or more sections that have overlapping flanges which are welded to form a leakproof seam. The inward flange then acts in the stead of depressions 12a. An advantage of the present diaphragm assembly to this type tank is readily apparent. Because the diaphragm seals at the fins, these may be spaced apart such that the diaphragm bridges the area to be welded and the heat from the welding operation will have less deleterious effect on the elastomer.

A further embodiment of the present invention is shown in FIG. 4, wherein the peripheral outward facing protrusion on the diaphragm 32 comprises laterally projecting circular-section rings 46a and 46b. The rings are molded on the outer peripheral edge of the diaphragm 32 in a similar manner as the fins 40a-b and will effect an O-ring type sealing engagement with the tank walls. However, in this embodiment, movement of the diaphragm in either direction may be caused by extreme pressure differentials and restraining ribs 12a in the tank wall and 34b in the backup ring may be required to establish a permanent location within the tank to maintain required chamber volume for air and water. In all other respects, the embodiment of FIG. 4 exhibits the advantages as described for the fins of FIGS. 2 and 3.

The invention offers marked advantages over the prior art in fabricating the expansion tank. First, swaging, crimping, cold-forming, or other specialized operations are not necessary to complete installation of the diaphragm. This not only results in a savings in manufacturing costs but also eliminates breakage problems involved with tanks having glass or plastic liners. Secondly, tolerances do not pose problems since the ring/diaphragm dimensions are not critical as long as the peripheral protrusions are sufficiently deformed by the backup ring to effect a sealing relationship with the tank walls. And third, more flexibility is offered in tailoring the diaphragm/ring assembly to the tank rather than visa versa.

While certain representative embodiments and details have been shown for the purpose of illustrating the invention, it will be apparent to those skilled in the art that various changes and modifications may be made therein without departing from the spirit or scope of the invention.

What is claimed is:

1. In combination with an expansion tank as used in pressurized water systems wherein one portion of the tank is occupied by water while the other portion is occupied by a gas, said tank having a liner mounted within the tank covering the walls of the tank that are in contact with the water, an assembly for separating the two portions of the tank at the wall/ liner interface into non-communicating chambers comprising:
   a. a substantially flexible elastomeric diaphragm mounted within the tank at the wall/liner interface, said diaphragm having at least two annular, outward projecting, wedge-shaped fins positioned around the outward facing peripheral surface thereof such that one of the fins is in contact with the tank wall at the interface while the other of said fins is in contact with the liner, and
   b. a continuous and substantially rigid backup ring positioned on the inward facing peripheral surface of the diaphragm and having a diameter less than the diameter of the liner but greater than the relaxed diameter of the diaphragm such that the fins are in compression and in sealing engagement with said tank and liner respectively when the assembly is inserted into the tank.

2. The assembly as set forth in claim 1, wherein the wedge shape of the fins is formed by the juncture of a concave surface and a straight tapered surface.

3. The assembly as set forth in claim 2, wherein the backup ring has an outward projecting flange that abuts the peripheral edge of the diaphragm.

4. The assembly as set forth in claim 3, wherein the backup ring further comprises at least one annular outward projecting depression, said flange and depression combining to limit relative movement between the diaphragm and backup ring.

5. The assembly as set forth in claim 1, wherein the diameter of the diaphragm at the apex of the fin contacting the liner is less than the diameter at the apex of the fin contacting the tank.

6. The assembly as set forth in claim 1, wherein the fins deform in the direction of the concave surface when the diaphragm is inserted into the tank.

7. In combination with an expansion tank as used in pressurized fluid systems wherein one portion of the tank is occupied by a fluid while the other portion of the tank is occupied by a gas, said fluid portion having a liner covering the walls of the tank occupied by fluid, an assembly for separating the tank into two non-communicating chambers at the wall/liner interface comprising:
   a. a substantially flexible elastomeric diaphragm having at least two annular protrusions around the outer peripheral surface thereof, one of the protrusions having a diameter to effect sealing engagement with the tank wall at the interface while the other has a diameter to effect sealing engagement with the liner; and
   b. a continuous and substantially rigid backup ring positioned on the inner peripheral surface of the diaphragm in the area of the protrusions, said ring having a diameter less than the diameter of the tank but greater than the relaxed diameter of the diaphragm prior to insertion into the tank such that stretching of the peripheral portion of the diaphragm over the ring increases the diameter of the protrusions to a dimension greater than the tank or the liner, said ring effecting compression of the protrusion upon insertion into the tank.

8. The assembly as set forth in claim 7 wherein the protrusions are laterally projecting wedge-shaped fins with a concave surface and a straight-tapered surface meeting to form the apex of the wedge, said wedge bending toward the concave surface when the diaphragm is inserted into the tank.

9. The assembly as set forth in claim 7 wherein the diameter of the diaphragm at the apex of the fin in sealing engagement with the tank wall is greater than the diameter at the apex of the fin in sealing engagement with the liner.

10. The assembly as set forth in claim 7, wherein the protrusions comprise at least two circular-section rings, one of said rings in sealing engagement with said tank wall while the other is in sealing engagement with said liner, the sealing engagement effected by the compressive force of the backup ring.

* * * * *

UNITED STATES PATENT OFFICE
CERTIFICATE OF CORRECTION

PATENT NO. : 3,931,834
DATED : January 13, 1976
INVENTOR(S) : Eugene Caillet

It is certified that error appears in the above-identified patent and that said Letters Patent are hereby corrected as shown below:

Column 4, line 64, change "7" to -- 8 --.

Signed and Sealed this

Ninth Day of November 1976

[SEAL]

Attest:

RUTH C. MASON
Attesting Officer

C. MARSHALL DANN
Commissioner of Patents and Trademarks